US007630942B2

(12) United States Patent
Bradski

(10) Patent No.: US 7,630,942 B2
(45) Date of Patent: Dec. 8, 2009

(54) MULTI-CORE STOCHASTIC DISCRIMINATION

(75) Inventor: Gary Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 11/711,943

(22) Filed: Feb. 28, 2007

(65) Prior Publication Data

US 2008/0208773 A1    Aug. 28, 2008

(51) Int. Cl.
*G06F 15/18* (2006.01)
(52) U.S. Cl. ....................................... 706/12
(58) Field of Classification Search ................ 706/12
See application file for complete search history.

(56) References Cited

U.S. PATENT DOCUMENTS

| 5,930,392 | A * | 7/1999 | Ho ............................. 382/224 |
| 6,009,199 | A * | 12/1999 | Ho ............................. 382/224 |
| 6,704,889 | B2 * | 3/2004 | Veenstra et al. ............... 714/39 |
| 6,922,482 | B1 * | 7/2005 | Ben-Porath ................. 382/149 |
| 7,237,148 | B2 * | 6/2007 | Czajkowski et al. .......... 714/21 |
| 7,246,100 | B2 * | 7/2007 | Bradski ........................ 706/12 |
| 7,272,583 | B2 * | 9/2007 | Bradski ........................ 706/12 |

OTHER PUBLICATIONS

On improvement of classification accuracy for stochastic discrimination Ning Zong; Xia Hong; Systems, Man, and Cybernetics, Part B, IEEE Transactions on vol. 35, Issue 1, Feb. 2005 pp. 142-149 Digital Object Identifier 10.1109/TSMCB.2004.839908.*
On the algorithmic implementation of stochastic discrimination Kleinberg, E.M.; Pattern Analysis and Machine Intelligence, IEEE Transactions on vol. 22, Issue 5, May 2000 pp. 473-490 Digital Object Identifier 10.1109/34.857004.*
Parameter Tuning using the Out-of-Bootstrap Generalisation Error Estimate for Stochastic Discrimination and Random Forests Prior, M.; Windeatt, T.; Pattern Recognition, 2006. ICPR 2006. 18th International Conference on vol. 2, pp. 498-501 Digital Object Identifier 10.1109/ICPR.2006.913.*
A random subspace method for co-training Jiao Wang; Si-wei Luo; Xian-hua Zeng; Neural Networks, 2008. IJCNN 2008. (IEEE World Congress on Computational Intelligence). IEEE International Joint Conference on Jun. 1-8, 2008 pp. 195 -200 Digital Object Identifier 10.1109/IJCNN.2008.4633789.*

(Continued)

*Primary Examiner*—Michael B Holmes
(74) *Attorney, Agent, or Firm*—David L. Guglielmi

(57) ABSTRACT

In some embodiments, multi-core stochastic discrimination is generally presented. In this regard, a method is introduced comprising providing random regions of a feature space to parallel cores, testing each random region for enrichment in parallel, recording coverage for each data point in each enriched random region in parallel, and calculating an overall average coverage for each data point among the enriched random regions. Other embodiments are also disclosed and claimed.

15 Claims, 2 Drawing Sheets

OTHER PUBLICATIONS

Predicting Blood-Brain Barrier Penetration by Stochastic Discrimination Dechang Chen; Jianwen Fang; Jiawei Yu; BioMedical Engineering and Informatics, 2008. BMEI 2008. International Conference on vol. 1, May 27-30, 2008 pp. 337-340 Digital Object Identifier 10.1109/BMEI.2008.243.*

Research and Application of a Method for Constructing Decision Forests Zhu Qiang; Service Systems and Service Management, 2007 International Conference on Jun. 9-11, 2007 pp. 1-6 Digital Object Identifier 10.1109/ICSSSM.2007.4280168.*

E.M. Kleinberg, "An Overtraining-Resistant Stochastic Modeling Method for Pattern Recognition", The Annals of Statistics, 1996, vol. 24, No. 6, pp. 2319-2349.

E.M. Kleinberg, "On the Algorithmic Implementation of Stochastic Discrimination", IEEE Transactions on Pattern Analysis and Machine Intelligence, vol. 22, No. 5, May 2000, pp. 473-490.

E.M. Kleinberg, "Stochastic Discrimination", Department of Mathematics, State University of New York at Buffalo, 33 pages.

* cited by examiner

MULTI-CORE STOCHASTIC DISCRIMINATION

FIELD OF THE INVENTION

Embodiments of the present invention generally relate to the field of statistical learning algorithms, and, more particularly to multi-core stochastic discrimination.

BACKGROUND OF THE INVENTION

Stochastic discrimination (SD) is a methodology for creating classifiers for use in, for example, pattern recognition. It is based on serially combining arbitrary numbers of weak components, which are usually generated by some pseudo-random process, to generalize to new data. For an implementation of SD training, please see E. M. Kleinberg, "On the algorithmic implementation of stochastic discrimination," IEEE Transactions on Pattern Analysis and Machine Intelligence, Vol. 22, No. 5, May 2000, 473-490.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to multi-core stochastic discrimination. In this regard, in accordance with but one example implementation of the broader teachings of the present invention, a multi-core SD agent is introduced. In accordance with but one example embodiment, the multi-core SD agent employs an innovative method to train and test using SD in parallel among multiple processors or processor cores. According to one example method, the multi-core SD agent may take a vote of the models developed at the cores to classify a test data point. According to another example method, the multi-core SD agent may maintain an overall average coverage of data points which each core uses in developing its model.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
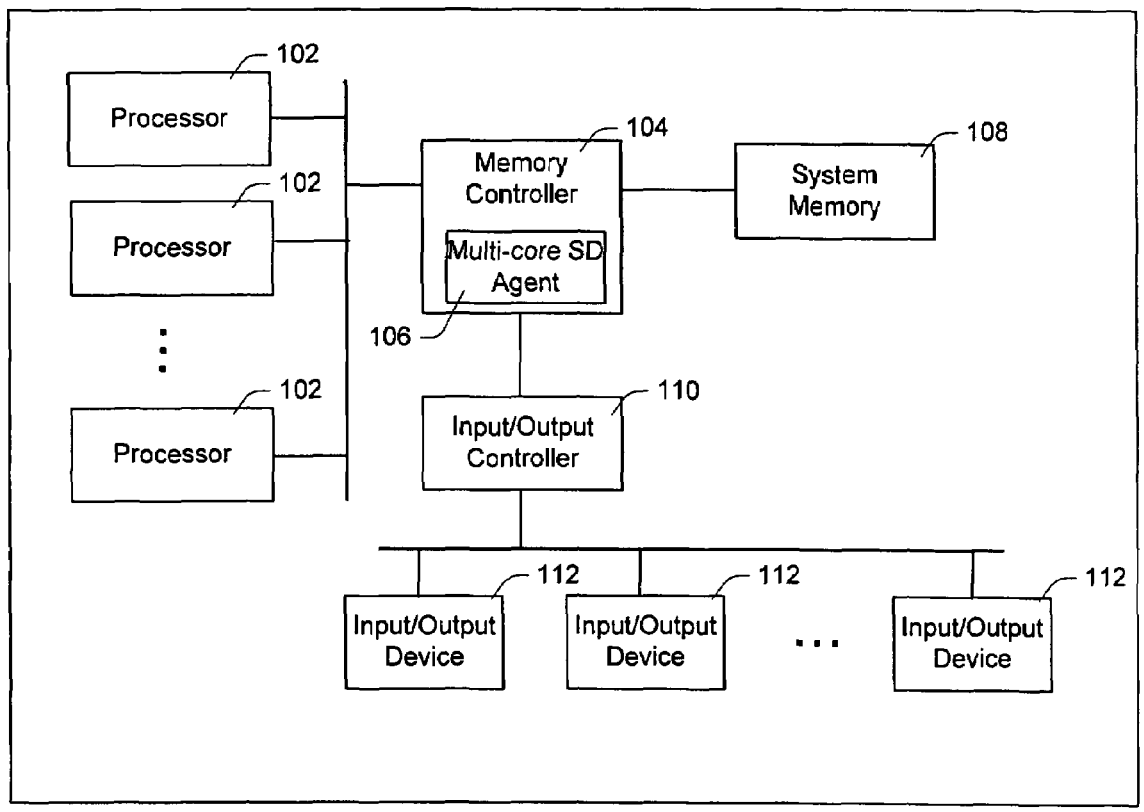
FIG. 1 is a block diagram of an example electronic appliance suitable for implementing the multi-core SD agent, in accordance with one example embodiment of the invention.

FIG. 1 is a block diagram of an example electronic appliance suitable for implementing the multi-core SD agent, in accordance with one example embodiment of the invention. Electronic appliance 100 is intended to represent any of a wide variety of traditional and nontraditional electronic appliances, laptops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 100 may include one or more of processor(s) 102, memory controller 104, multi-core SD agent 106, system memory 108, input/output controller 110, and input/output device(s) 112 coupled as shown in FIG. 1. Multi-core SD agent 106, as described more fully hereinafter, may well be used in electronic appliances of greater or lesser complexity than that depicted in FIG. 1. Also, the innovative attributes of multi-core SD agent 106 as described more fully hereinafter may well be embodied in any combination of hardware and software.

Processor(s) 102 may represent any of a wide variety of control logic including, but not limited to one or more of a microprocessor, a microprocessor core, a programmable logic device (PLD), programmable logic array (PLA), application specific integrated circuit (ASIC), a microcontroller, and the like, although the present invention is not limited in this respect.

Memory controller 104 may represent any type of chipset or control logic that interfaces system memory 108 with the other components of electronic appliance 100. In one embodiment, the connection between processor(s) 102 and memory controller 104 may be referred to as a front-side bus. In another embodiment, memory controller 104 may be referred to as a north bridge.

Multi-core SD agent 106 may have an architecture as described in greater detail with reference to FIG. 2. Multi-core SD agent 106 may also perform one or more methods for multi-core SD training, such as the method described in greater detail with reference to FIG. 3. While shown as being part of memory controller 104, multi-core SD agent 106 may well be part of another component, for example processor(s) 102, or may be implemented in software or a combination of hardware and software.

System memory 108 may represent any type of memory device(s) used to store data and instructions that may have been or will be used by processor(s) 102. Typically, though the invention is not limited in this respect, system memory 108 will consist of dynamic random access memory (DRAM). In one embodiment, system memory 108 may consist of Rambus DRAM (RDRAM). In another embodiment, system memory 108 may consist of double data rate synchronous DRAM (DDRSDRAM). The present invention, however, is not limited to the examples of memory mentioned here.

Input/output (I/O) controller 110 may represent any type of chipset or control logic that interfaces I/O device(s) 112 with the other components of electronic appliance 100. In one embodiment, I/O controller 110 may be referred to as a south bridge.

Input/output (I/O) device(s) 112 may represent any type of device, peripheral or component that provides input to or processes output from electronic appliance 100. In one embodiment, though the present invention is not so limited, at least one I/O device 112 may be a network interface controller.

Figure 2:
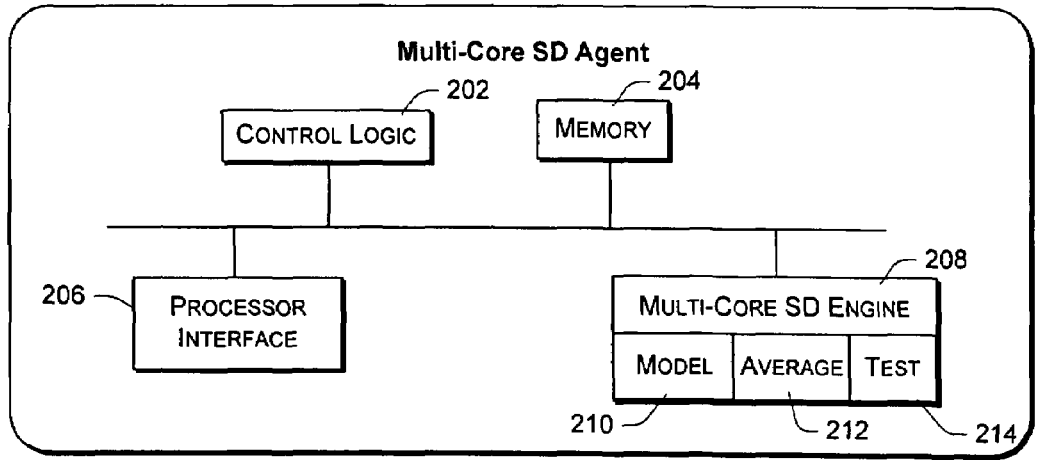
FIG. 2 is a block diagram of an example multi-core SD agent architecture, in accordance with one example embodiment of the invention.

FIG. 2 is a block diagram of an example multi-core SD agent architecture, in accordance with one example embodiment of the invention. As shown, multi-core SD agent 106 may include one or more of control logic 202, memory 204, processor interface 206, and multi-core SD engine 208 coupled as shown in FIG. 2. In accordance with one aspect of the present invention, to be developed more fully below, multi-core SD agent 106 may include a multi-core SD engine 208 comprising one or more of model services 210, average services 212, and/or test services 214. It is to be appreciated that, although depicted as a number of disparate functional blocks, one or more of elements 202-214 may well be combined into one or more multifunctional blocks. Similarly, multi-core SD engine 208 may well be practiced with fewer functional blocks, i.e., with only average services 212, without deviating from the spirit and scope of the present invention, and may well be implemented in hardware, software, firmware, or any combination thereof. In this regard, multi-core SD agent 106 in general, and multi-core SD engine 208 in particular, are merely illustrative of one example implementation of one aspect of the present invention. As used herein, multi-core SD agent 106 may well be embodied in hardware, software, firmware and/or any combination thereof.

As introduced above, multi-core SD agent 106 may have the ability to train and test using SD in parallel among multiple processor cores. In one embodiment, multi-core SD agent 106 may c. In another embodiment, multi-core SD agent 106 may c.

As used herein control logic 202 provides the logical interface between multi-core SD agent 106 and its host electronic appliance 100. In this regard, control logic 202 may manage one or more aspects of multi-core SD agent 106 to provide a control interface for electronic appliance 100 to initiate multi-core SD training or testing, e.g., through memory controller 104 or through processor(s) 102 in the event of a request.

According to one aspect of the present invention, though the claims are not so limited, control logic 202 may receive event indications such as, e.g., request to commence multi-core SD training. Upon receiving such an indication, control logic 202 may selectively invoke the resource(s) of multi-core SD engine 208. As part of an example method for multi-core SD training, as explained in greater detail with reference to FIG. 3, control logic 202 may selectively invoke model services 210 that may generate random regions of a feature space which serve as weak models. Control logic 202 also may selectively invoke average services 212 or test services 214, as explained in greater detail with reference to FIG. 3, to calculate an overall average coverage of data points among the cores or to test data points using previous training, respectively. As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include volatile and non-volatile memory elements, possibly random access memory (RAM) or read only memory (ROM), including flash memory. Memory 204 may be used to store feature spaces and overall average coverages, for example.

Processor interface 206 provides a path through which multi-core SD agent 106 can interface with the processor(s) 102 to communicate feature spaces and models, average coverages, data points and classifications, for example.

As introduced above, multi-core SD engine 208 may be selectively invoked by control logic 202 to generate random regions of a feature space which serve as weak models, to calculate an overall average coverage of data points among the cores, or to test data points using previous training. In accordance with the illustrated example implementation of FIG. 2, multi-core SD engine 208 is depicted comprising one or more of model services 210, average services 212 and test services 214. Although depicted as a number of disparate elements, those skilled in the art will appreciate that one or more elements 210-214 of multi-core SD engine 208 may well be combined without deviating from the scope and spirit of the present invention.

Model services 210, as introduced above, may provide multi-core SD agent 106 with the ability to generate random regions of a feature space which serve as weak models. In one example embodiment, model services 210 may map a randomly selected subset to a core in response to a signal from the core that it is ready for a new weak model to process. In one example embodiment, model services 210 may map all data points to the cores and the cores generate their own weak models to process.

As introduced above, average services 212 may provide multi-core SD agent 106 with the ability to calculate an overall average coverage of data points among the cores. In one example embodiment, average services 212 may continually receive coverage data for each data point from each core and use this data to maintain an overall average coverage. In another example embodiment, average services 212 may map a global overall average coverage to each core for use in testing uniformity.

Test services 214, as introduced above, may provide multi-core SD agent 106 with the ability to test data points using previous training. In one embodiment, test services 214 may map a data point to be classified or regressed to each core. Each core would then decide if the data point is within a class or regression level based on its pool of weak models developed previously. Test services 214 may then tabulate the votes of each core decision and determine the classification based on a majority of the votes.

Figure 3:
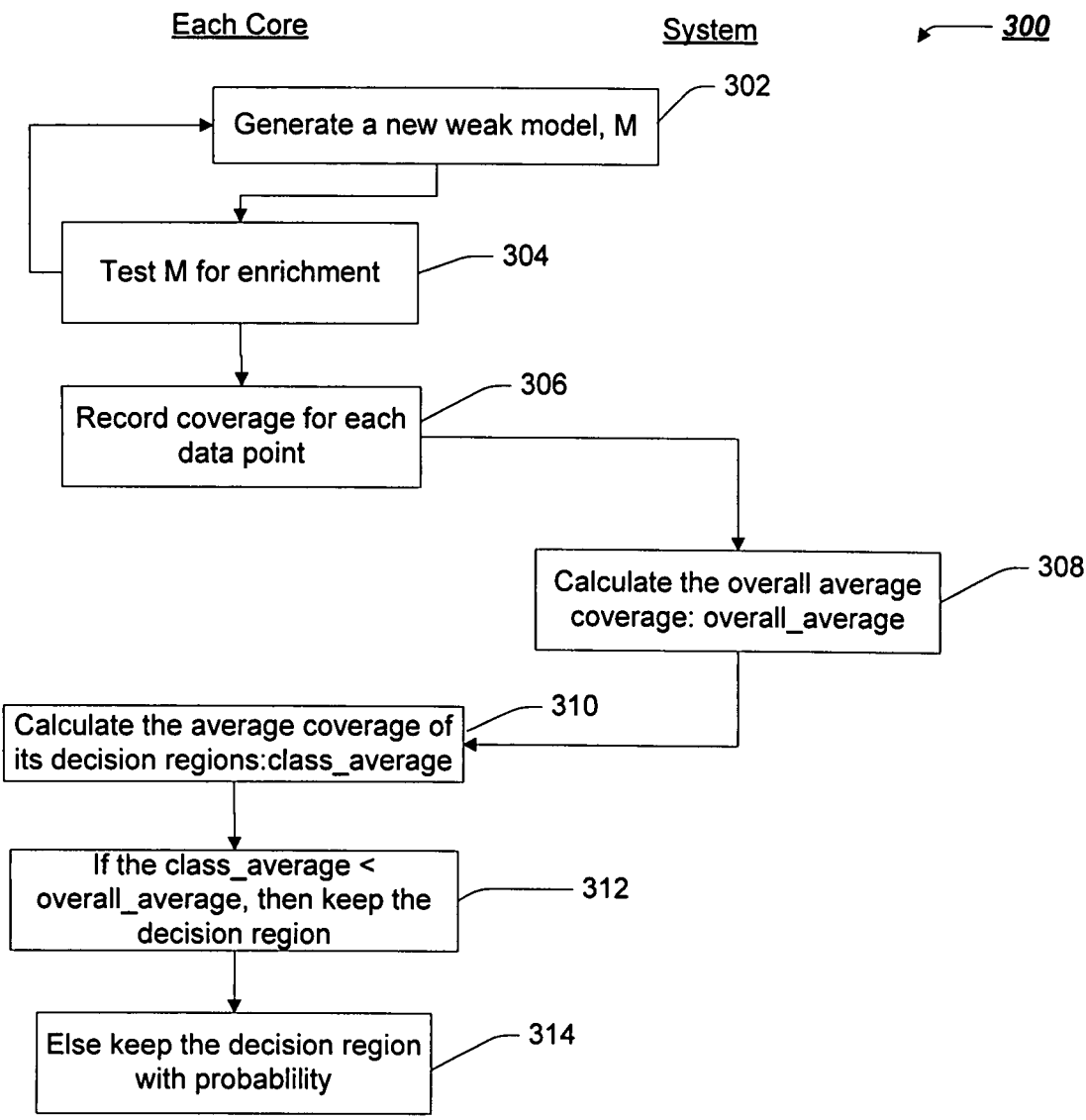
FIG. 3 is a flow chart of an example method for multi-core SD training, in accordance with one example embodiment of the invention.

FIG. 3 is a flow chart of an example method for multi-core SD training, in accordance with one example embodiment of the invention. It will be readily apparent to those of ordinary skill in the art that although the following operations may be described as a sequential process, many of the operations may in fact be performed in parallel or concurrently. In addition, the method may be performed iteratively for any number of times.

According to but one example implementation, the method of FIG. 3 begins with control logic 202 selectively invoking model services 210 to generate (302) a new weak model, M. In one example embodiment, model services 210 generates a new weak model (or random region of a feature space) for a processor 102 running the SD training thread upon request. In another embodiment, model services 210 may store the data points of the feature space in memory 204 which may be mapped to each processor 102 running the SD training thread. In this case, each processor 102 may generate a new weak model by randomly selecting a subset of the feature space.

Next, the core (processor 102) tests M (304) for enrichment. In one example embodiment, an enriched random region requires greater than fifty percent presence of data points belonging to the class being modeled. In another example embodiment, model services 210 may discard any weak model M that does not classify data points with greater than fifty percent accuracy and restart the process.

Each core may then record coverage (306) for each data point. In one example embodiment, coverage is recorded as either a one or a zero for each data point.

Next, average services 212 may calculate (308) the overall average coverage. In one embodiment, average services 212 may continually update the overall average as coverage data is received from each thread running on a core.

Each core may then calculate (310) the average coverage of its retained decision regions. At that point, the core will keep the current decision region (312), if the class average is less than the overall average. Otherwise it will keep the decision region (314) with probability (the overall average divided by the class average). One skilled in the art would appreciate that each core's coverage would tend toward the global average.

Figure 4:
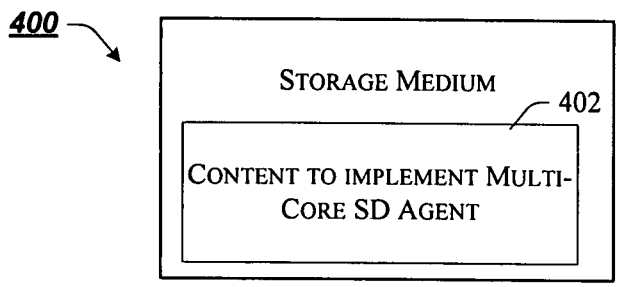
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the multi-core SD agent 106 and/or associated method 300. In this regard, storage medium 400 includes content 402 (e.g., instructions, data, or any combination thereof) which, when executed, causes the appliance to implement one or more aspects of multi-core SD agent 106, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   providing random regions of a feature space to parallel cores;
   testing each random region for enrichment in parallel;
   recording coverage for each data point in each enriched random region in parallel; and
   calculating an overall average coverage for each data point among the enriched random regions.

2. The method of claim 1, further comprising providing the overall average coverage to each parallel core.

3. The method of claim 2, further comprising calculating a class average coverage at each parallel core.

4. The method of claim 3, further comprising adding each enriched random region to a pool of regions if class average is less than the overall average.

5. The method of claim 4, further comprising otherwise adding each enriched random region along with a percent probability to the pool of regions.

6. The method of claim 5, further comprising determining whether a test data point is a member of a class by a vote of the parallel cores.

7. The method of claim 1, wherein providing random regions of a feature space to parallel cores comprises sending data to core cache memory.

8. The method of claim 1, wherein providing random regions of a feature space to parallel cores comprises pointing to data in a shared memory.

9. A storage medium comprising content which, when executed by an accessing machine, causes the accessing machine to provide random regions of a feature space to parallel cores, to test each random region for enrichment in parallel, to record coverage for each data point in each enriched random region in parallel, and to calculate an overall average coverage for each data point among the enriched random regions.

10. The storage medium of claim 9, further comprising content which, when executed by the accessing machine, causes the accessing machine to provide the overall average coverage to each parallel core.

11. The storage medium of claim 10, further comprising content which, when executed by the accessing machine, causes the accessing machine to calculate a class average coverage at each parallel core.

12. The storage medium of claim 11, further comprising content which, when executed by the accessing machine, causes the accessing machine to add each enriched random region to a pool of regions if class average is less than the overall average.

13. The storage medium of claim 12, further comprising content which, when executed by the accessing machine, causes the accessing machine to otherwise add each enriched random region along with a percent probability to the pool of regions.

14. The storage medium of claim 13, further comprising content which, when executed by the accessing machine, causes the accessing machine to determine whether a test data point is a member of a class by a vote of the parallel cores.

15. The storage medium of claim 9, wherein the content to provide random regions of a feature space to parallel cores comprises content which, when executed by the accessing machine, causes the accessing machine to sending data to core cache memory.

* * * * *

UNITED STATES PATENT AND TRADEMARK OFFICE
CERTIFICATE OF CORRECTION

| | | |
|---|---|---|
| PATENT NO. | : 7,630,942 B2 | Page 1 of 1 |
| APPLICATION NO. | : 11/711943 | |
| DATED | : December 8, 2009 | |
| INVENTOR(S) | : Gary Bradski | |

It is certified that error appears in the above-identified patent and that said Letters Patent is hereby corrected as shown below:

IN THE SPECIFICATION

In column 1, Line 10, insert,

--GOVERNMENT LICENSE RIGHTS

This invention was made with Government support under PO# 097001 awarded by the Department of Defense. The Government has certain rights in this invention.--.

Signed and Sealed this
Twenty-seventh Day of October, 2015

Michelle K. Lee
*Director of the United States Patent and Trademark Office*